United States Patent [19]
Chen

[11] Patent Number: 5,805,948
[45] Date of Patent: Sep. 8, 1998

[54] FILM-CHAMBER COVER OF AN ADVANCED PHOTO SYSTEM (APS) CAMERA

[75] Inventor: Yao-Man Chen, Taipei, Taiwan

[73] Assignee: Quark Opto-Electronics Inc., China

[21] Appl. No.: 901,794

[22] Filed: Jul. 28, 1997

[51] Int. Cl.[6] .................................................. G03B 17/02
[52] U.S. Cl. .......................... 396/535; 396/536; 396/537; 396/538
[58] Field of Search .................................. 396/439, 535, 396/536, 537, 538

[56] References Cited

U.S. PATENT DOCUMENTS

| 5,565,951 | 10/1996 | Tokui | 396/538 |
| 5,666,575 | 9/1997 | Stephenson, III et al. | 396/538 |
| 5,697,007 | 12/1997 | Nishimura | 396/535 |

*Primary Examiner*—Eddie C. Lee
*Attorney, Agent, or Firm*—Pollock, Vande Sande & Priddy

[57] ABSTRACT

A film-chamber cover of an advanced photo system (APS) camera is for indicating whether a film cassette is loaded within a film chamber of the APS camera or not. The film-chamber cover includes: a bottom cover furnished with a viewing window, an upper cover furnished with a shaft hole, a moving shaft slidably connected with the shaft hole between the upper and bottom covers, and a swing plate formed with characteristic symbols thereon. The swing plate is pivoted to the bottom cover and is driven by a restoring member such that when the film chamber is not loaded with a film cassette, the swing plate can be restored to a position where a symbol indicating emptiness of the chamber aligns the window of the bottom cover. When a film cassette is loaded within the chamber, the film cassette presses an upper end of the moving shaft such that the moving shaft slides downwards and pushes the swing plate to swing to another position where a symbol indicating existence of the film cassette aligns the window of the bottom cover.

11 Claims, 7 Drawing Sheets

FILM-CHAMBER COVER OF AN ADVANCED PHOTO SYSTEM (APS) CAMERA

BACKGROUND OF THE INVENTION

1. Field of the Invention

This invention relates to a film-chamber cover of an advanced photo system (APS) camera and, more particularly, to a film-chamber cover which is furnished with a film indicating mechanism for indicating whether or not a film cassette is loaded within the film chamber of the APS camera.

2. Background of the Invention

Figure 8:
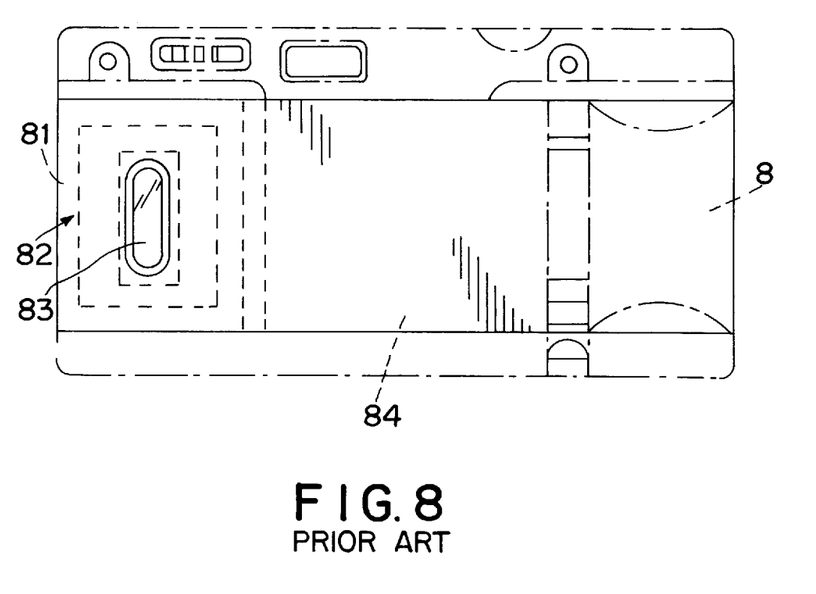
FIG. 8 is a rear side view of a conventional camera.

Conventional camera 8, as shown in FIG. 8, generally has a hinged back cover 82 for covering both the film chamber 81 and the exposure room 84. Some kind of conventional camera 8 is furnished with a viewing window 83 which is formed on the back cover 82 at a position coordinated with the film chamber 81 such that user can look through the window 83 to see if a film cassette is loaded within the film chamber 81 or not. Sheet-like sponge is furnished on an inner surface of the back cover 82 to prevent light from passing through the window 83 such that the film cassette loaded within the chamber 81 will not be accidentally exposed by light coming from outside.

In recent years, a new photo system which is completely different from the conventional camera is developed by leading camera manufacturers in Japan and the United States and is called the Advanced Photo System (APS). As the same as conventional camera, APS camera is also designed to prevent the film from being accidentally exposed by light coming from outside. Since APS camera uses a specific film cassette which is designed for APS cameras only, in order to accommodate the function of the specific film cassette, APS camera is designed to have the film cassette loaded in the film chamber from the bottom. A film-chamber cover which is absolutely lightproof is furnished on the bottom of the film chamber to prevent light from passing through. However, such a lightproof cover also results in a significant deficiency since a user cannot check the existence of the film cassette from outside of the camera. Therefore, there is still a room for further improvement of prior art APS camera.

SUMMARY OF THE INVENTION

In view of the aforesaid limitations of prior art APS camera, it is therefore an object of the present invention to provide a film indicating mechanism which can indicate whether a film cassette is loaded with the film chamber of the APS camera or not.

It is another object of the present invention to provide a film indicating mechanism furnished on a film-chamber cover of an APS camera. The film-chamber cover not only provides a means to indicate the existence of the film cassette within the chamber but also functions as a supporter to retain the film cassette at an appropriate position within the chamber such that the film can be properly fed into the exposure room of the APS camera.

It is yet a further object of the present invention to provide a film-chamber cover of an APS camera for indicating whether a film cassette is loaded within a film chamber of the APS camera or not.

The film-chamber cover of the invention includes: a bottom cover furnished with a viewing window, an upper cover furnished with a shaft hole, a moving shaft slidably connected with the shaft hole between the upper and bottom covers, and a swing plate formed with characteristic symbols thereon. The swing plate is pivoted to the bottom cover and is driven by a restoring member such that when the film chamber is not loaded with a film cassette, the swing plate can be restored to the position where the symbol indicating emptiness of the chamber aligns the window of the bottom cover. When a film cassette is loaded within the chamber, the film cassette presses an upper end of the moving shaft such that the moving shaft slides downwards and pushes the swing plate to swing to the other position where the symbol indicating existence of the film cassette aligns the window of the bottom cover.

BRIEF DESCRIPTION OF THE DRAWINGS

The foregoing features of the present invention may be more fully understood from the following detailed description of the specification, read in conjunction with the accompanying drawings, wherein.

DETAILED DESCRIPTION OF THE PREFERRED EMBODIMENT

Figure 1:
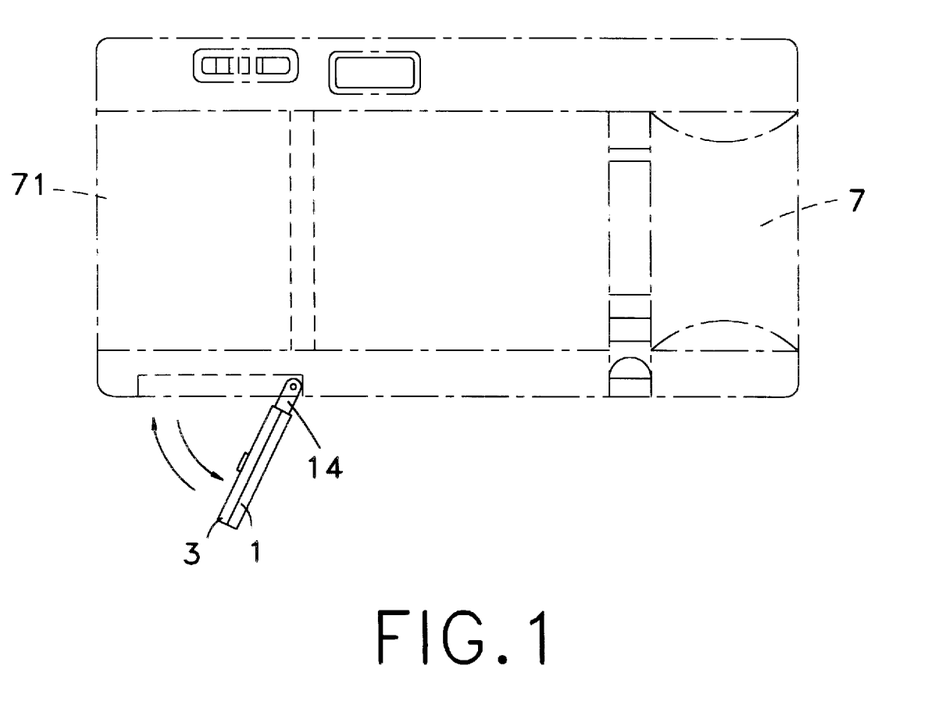
FIG. 1 is a rear side view of a preferred embodiment of a film-chamber cover in accordance with the present invention, which illustrates the coordinated relationship between the cover and the APS camera.
Figure 2:
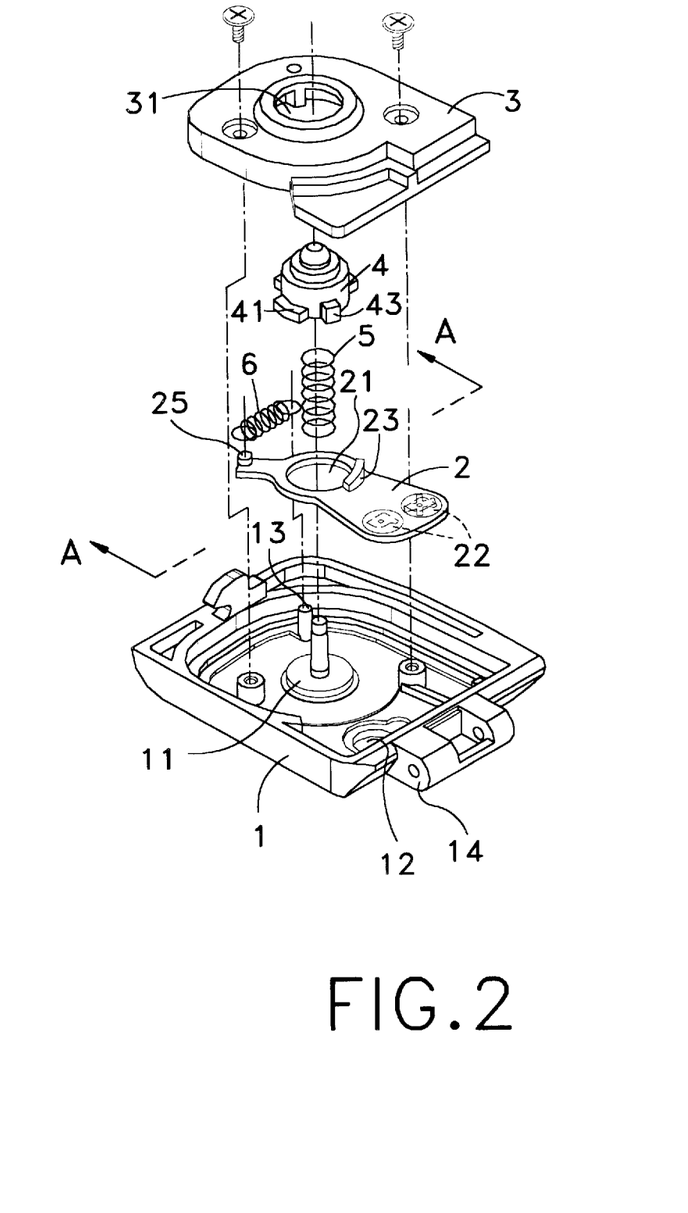
FIG. 2 is an exploded view of a preferred embodiment of a film-chamber cover in accordance with the present invention.

Referring to FIG. 1, a film-chamber cover of the present invention is generally for an advanced photo system (APS) camera 7 and is connected at the lower end of the film chamber 71 of the camera 7. A preferred embodiment of the film-chamber cover in accordance with the present invention is shown in FIG. 2, which comprises a bottom cover 1, an upper cover 3, a moving shaft 4, a spring 5 and a swing plate 2. The bottom cover 1 is furnished with a shaft 11, a viewing window 12 and a hook 13 fixedly hitched with one end of a tension spring 6. The swing plate 2 is made of thin hard material defining a first end and a second end thereof. A shaft hole 21 is formed on the swing plate 2 at a location between the first and second ends and is pivoted on bottom of the shaft 11 of the bottom cover 1. The first end of the swing plate 2 is furnished with a hook-like protrusion 25 thereon for fixedly hitching with the other end of the spring 6. An oblique ridge 23 is furnished on the swing plate 2 at a location between the shaft hole 21 and the second end of the swing plate 2 and is extended upwards from an upper surface of the swing plate 2. Two characteristic symbols 22 which respectively indicate the "empty" and "loaded" status of the film chamber 71 are formed on the second end of the swing plate 2 by label sticking, printing or molding. A lower end of the spring 5 is supported by an upper surface of the bottom cover 1 while having the upper end of the spring 5 passing through the shaft hole 21 of the swing plate 2 and coupling with the moving shaft 4. The upper cover 3 is furnished with a hole 31 defining an axis thereof and is fixedly mounted upon the bottom cover 1 such that the swing plate 2 and the springs 5,6 can be housed between the upper and bottom covers 3,1. The moving shaft 4 is mounted between the upper and bottom covers 3,1 in such a manner that the moving shaft 4 is movably coupled within the hole 31 of the upper cover 3 having a top end of the moving shaft 4 protruding out of the hole 31 while the bottom end of the moving shaft 4 being limited between the upper and bottom covers 3,1.

Figure 5A:
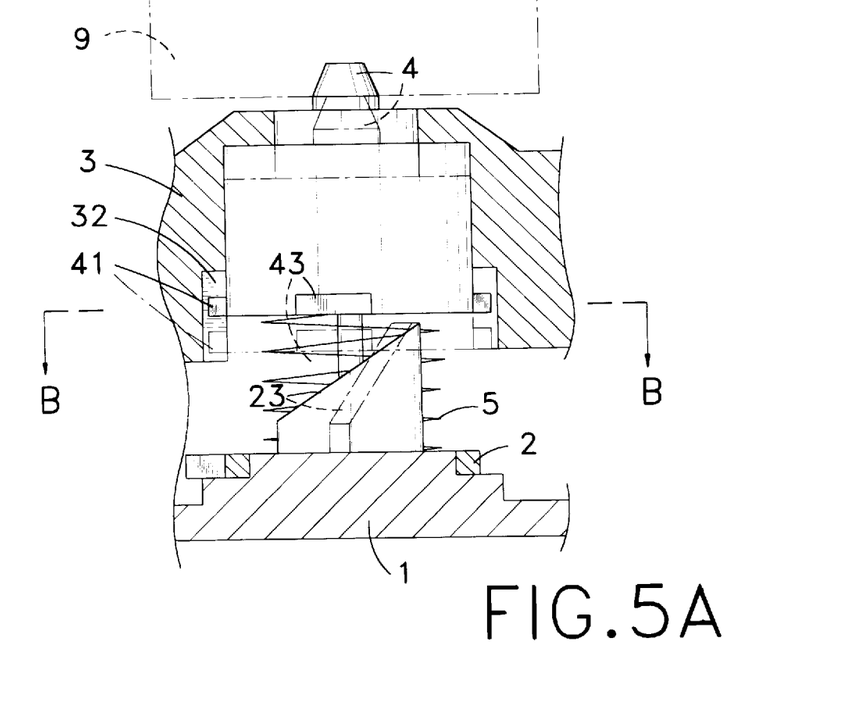
FIG. 5A is a sectional view taken along line A—A of FIG. 2.
Figure 5B:
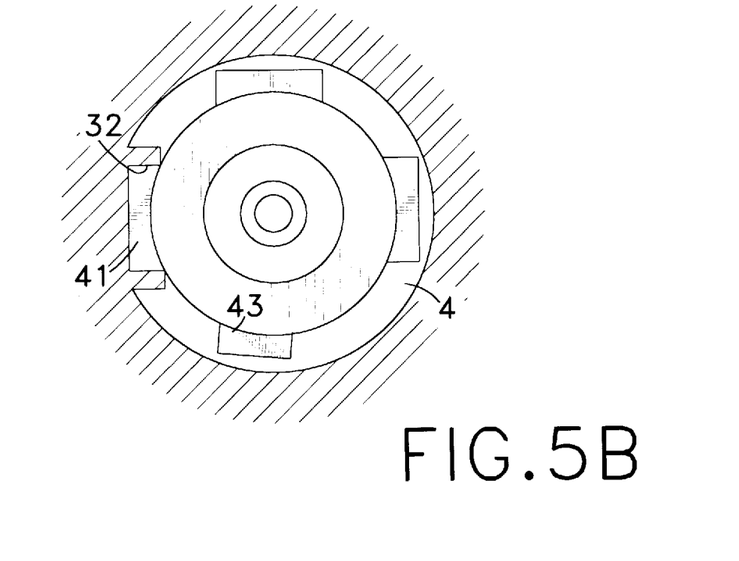
FIG. 5B is a sectional view taken along line B—B of FIG. 5A.

A guiding mechanism is furnished between the moving shaft 4 and the upper cover 3 for guiding the moving shaft 4 to slide along the axis of the hole 31 and preventing the moving shaft 4 from rotating. The guiding mechanism, which is in accordance with the preferred embodiment shown in FIG. 2, is located between an inner surface of the hole 31 and an outer surface of the moving shaft 4. Referring to FIG. 5A and 5B, four straight ribs 41 are formed around a lower end of the outer surface of the moving shaft 4. Straight guiding grooves 32 are formed around the inner surface of the hole 31 and are coordinated with the straight ribs 41. The guiding grooves 32 are elongated and extended along a direction parallel to the axis of the hole 31 such that, when the moving shaft 4 is assembled within the hole 31 having the straight ribs 41 slidably mated with coordinated guiding grooves 32, the moving shaft 4 can be guided to perform a sliding movement along the axis of the hole 31 without of the possibility of rotation. A swing mechanism for performing a swinging movement of the swing plate 2 when the moving shaft 4 slides downwards is furnished between the moving shaft 4 and the swing plate 2. The swing mechanism shown in FIG. 5A and 5B includes the oblique ridge 23 of the swing plate 2 and a side ridge 43 which is formed on the bottom end of the moving shaft 4 at a location right above the oblique ridge 23. When a film cassette 9 is loaded into the film chamber, the bottom end of the film cassette 9 presses the top end of the moving shaft 4 such that the moving shaft 4 is forced to move downwards along the axis, which substantially results in the oblique ridge 23 being pushed by the side ridge 43 so as to drive the swing plate 2 pivoting about the shaft 11 of the bottom cover 1.

As shown in FIG. 2, the coordination of the spring 6, the hook 13 and the hook-like protrusion 25 substantially forms a means for restoring the swing plate 2 back to a predetermined original position when the side ridge 43 of the moving shaft 4 is not pushing the oblique ridge 23 of the swing plate 2 since the spring 6 provides a sustained force pulling the hook-like protrusion 25 at the first end of the swing plate 2.

Figure 3:
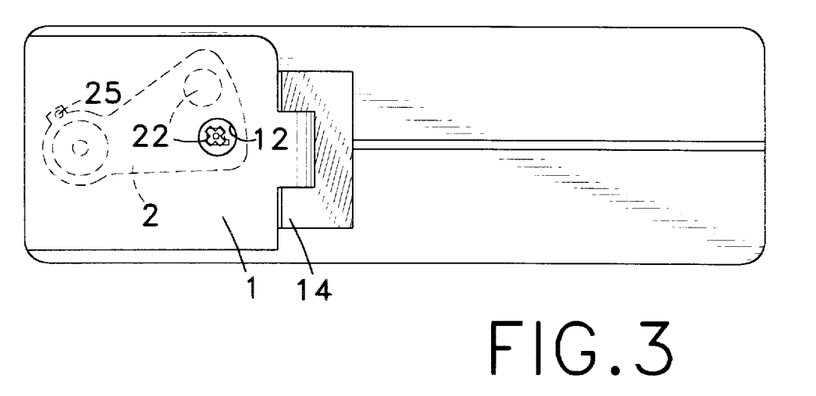
FIG. 3 is a down side view of the APS camera of FIG. 1, wherein the film chamber of the camera is empty.
Figure 4:
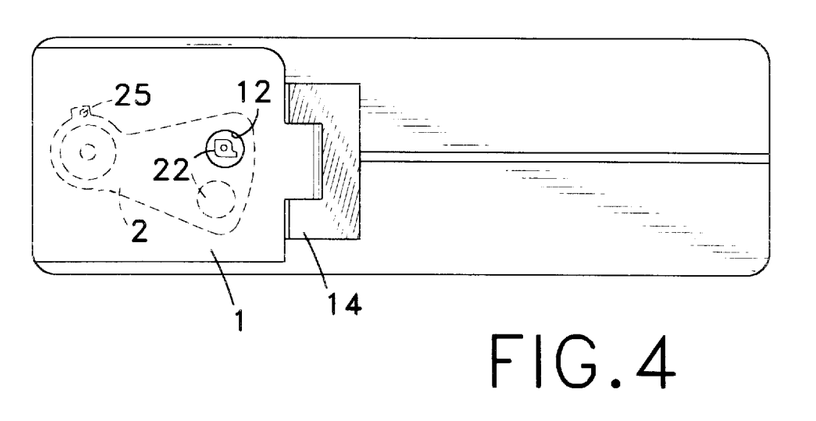
FIG. 4 is a down side view similar to FIG. 3, wherein the film chamber of the camera is loaded with film cassette.

Referring to FIG. 3 in conjunction with FIG. 5A and 5B, when there is no film cassette loaded within the film chamber, the moving shaft 4 will not be pressed downwards by the film cassette but will be pushed upwards by the spring 5 coupled therewith. Therefore the swing plate 2 is pulled by the spring 6 to the predetermined original position upon the bottom cover 1. In the mean time, the "empty" symbol 22 (such as an "X" symbol or the like) which indicates the empty status of the film chamber aligns with the viewing window 12 of the bottom cover 1 and thus is visible from outside of the APS camera. When the film cassette 9 is loaded into the film chamber, the moving shaft 4 is pressed to slide downwards and, as a result, the oblique ridge 23 is pushed by the side ridge 43 to perform a relative bias movement between the ridges 23,43. Such that the swing plate 4 pivots about the shaft 11 to a position where the other symbol 22 which indicates the "loaded" status of the film chamber aligns with the window 12 of the bottom cover 1 as shown in FIG. 4. Once the film cassette is taken out of the film chamber, the force pushing the oblique ridge 23 will be released and the swing plate 2 will be restored back to its original position as shown in FIG. 3. Therefore a user can easily and readily identify whether a film cassette is loaded in the film chamber of the APS camera or not without the possibility of film cassette being accidentally exposed by light from outside.

It is noted that following illustrated embodiments have in general similar structure like the one shown in FIG. 3. Therefore same numerals are used for similar type of elements.

Figure 6A:
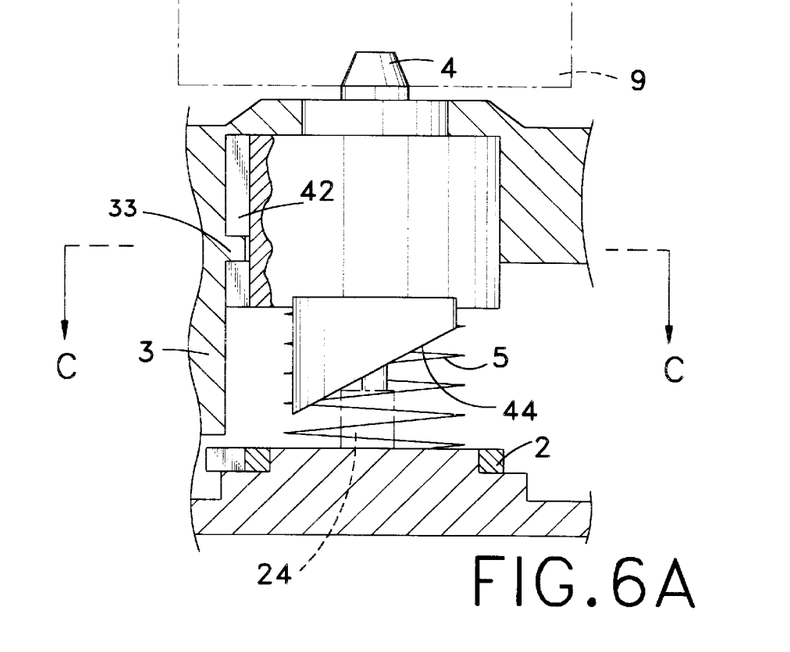
FIG. 6A is sectional view similar to FIG. 5A, yet illustrates another embodiment of the present invention.
Figure 6B:
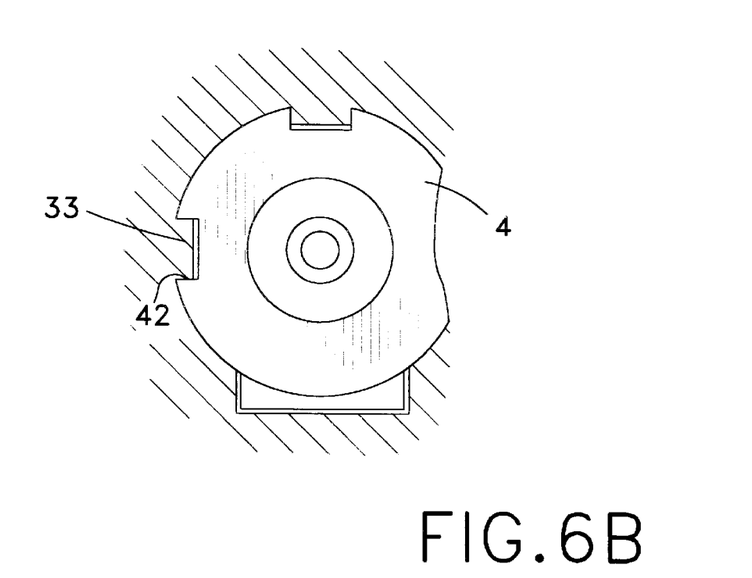
FIG. 6B is a sectional view taken along line C—C of FIG. 6A.

FIG. 6A and 6B illustrate another embodiment of the present invention, wherein the structure of the guiding mechanism and the swing mechanism is in a reversed manner comparing to the one shown in FIG. 5A and 5B. As shown in FIG. 6A and 6B, an oblique ridge 44 is formed at the bottom end of the moving shaft 4 and is extended downwards. A protrusive ridge 24 coordinated with the oblique ridge 44 is formed on the swing plate 2 and is located right below the oblique ridge 44 such that when the moving shaft 4 slides downwards, the oblique ridge 44 pushes the protrusive ridge 24 to perform a swinging movement of the swing plate 2. In addition, straight ribs 33 are formed around the inner surface of the hole 31 of the upper cover 3 and the coordinated guiding grooves 42 are formed around the outer surface of the moving shaft 4. Furthermore, it is rather obvious for any person skilled in the art to replace the tension spring 6 by a torsion spring.

Figure 7:
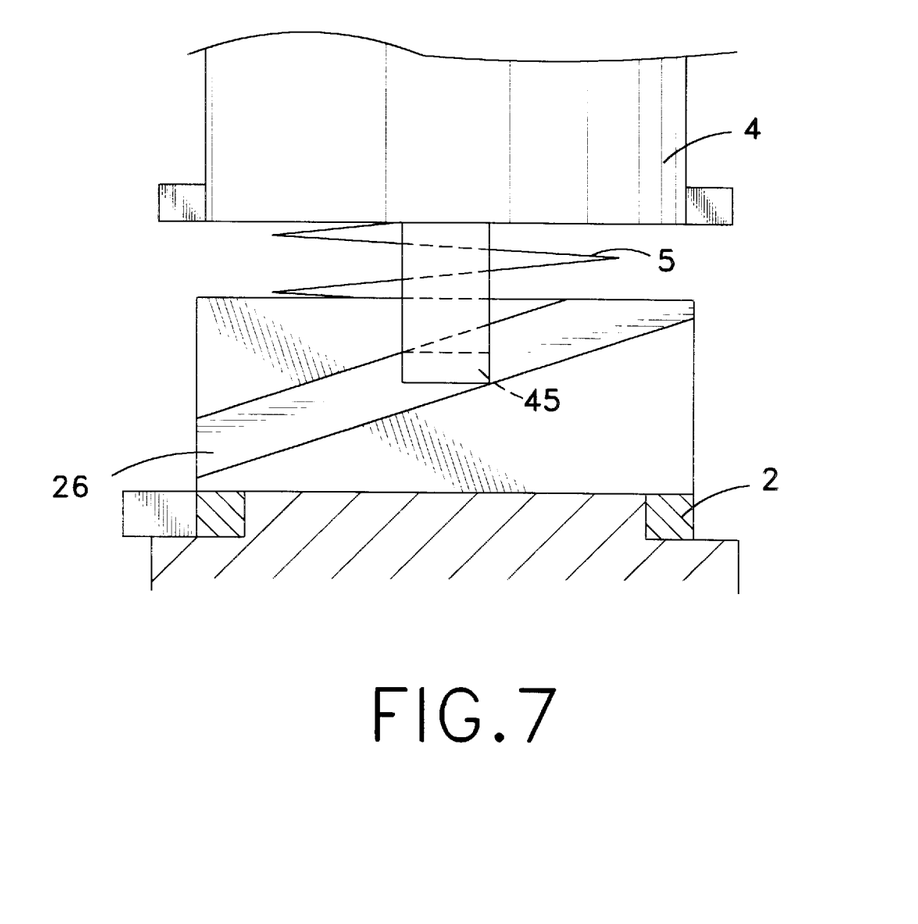
FIG. 7 is sectional view similar to FIG. 5A, which illustrates a further embodiment of the present invention.

FIG. 7 illustrates a further embodiment of the present invention, wherein the swing mechanism comprises a recessed guiding track 26 and a sliding block 45. The bottom end of the sliding block 45 is slidably engaged with the guiding track 26. The guiding track 26 is oblique and is furnished on the swing plate 2. The sliding block 45 is furnished on the lower end of the moving shaft 4 and extends downwards from the moving shaft 4. When the moving shaft 4 slides downwards, the bottom end of the sliding block 45 moves downwards along the oblique guiding track 26 so as to push the swing plate 2 to pivot. When the moving shaft 4 slides upwards, the bottom end of the sliding block 45 moves upwards along the oblique guiding track 26 such that the swing plate 2 is forced to restore back to its original position. Therefore, the spring 6 mentioned above can be eliminated in this embodiment. Of course, it is also obvious for any person skilled in the art that the sliding block can also be furnished on the swing plate while the recessed guiding track is furnished on the moving shaft.

Please refer back to FIG. 1, in conjunction with FIG. 2, 3 and 4, a hinge member 14 is furnished at one end of the film-chamber cover for pivotally connecting the film-chamber cover to the bottom end of the film chamber 71 of the APS camera 7. Such that the film-chamber cover is pivotal about the hinge member 14 between a locking position covering the bottom end of the film chamber 71 and an opening position leaving the film chamber 71 open for receiving a film cassette. Although the hinge member 14 shown in FIG. 1 is furnished on the bottom cover 1, however, it can also be furnished on the upper cover. In addition, the film-chamber cover can not only be assembled with the camera by means of the hinge member, the film-chamber can also be assembled with the camera by a sliding means wherein two guiding grooves are furnished at the bottom end of the film chamber and two side ridges which are respectively coordinated with the grooves are formed at two opposed sides of the film-chamber cover such that the film-chamber cover can slide to assemble with the camera by the mating of the ridges and grooves.

Although certain specific embodiment of the present invention has been shown and described above, it is to be understood that many modification thereof are possible. The present invention, therefore, is not to restrict the spirit of the appended claims.

What is claimed is:

1. A film-chamber cover of an advanced photo system (APS) camera for indicating whether a film cassette is loaded within a film chamber of the APS camera or not, said film-chamber cover comprising:

a bottom cover furnished with a viewing window thereon;

a swing plate defining a first end and a second end thereof, said swing plate being pivotally connected with said bottom cover at a position between said first and second ends thereof and being flush with said bottom cover, said second end of said swing plate having at least a symbol located at a position aligned with said window of said bottom cover;

an upper cover fixedly mounted upon said bottom cover, said upper cover being furnished with a hole defining an inner surface and an axis thereof;

a moving shaft defining an outer surface thereon, said moving shaft being mounted between said upper and bottom covers having said outer surface of said moving shaft slidably coupled within said hole of said upper cover;

a resilient member coupled with said moving shaft for providing a force pushing said moving shaft upwards;

a guiding mechanism located between said moving shaft and said upper cover for guiding the moving shaft to slide along a direction coincident with said axis of said hole of said upper cover and preventing said moving shaft from rotating about said axis;

a swing mechanism located between said moving shaft and said swing plate for performing a swinging movement of the swing plate when the moving shaft slides downwards along said axis; and means for restoring said swing plate back to its original position when said moving shaft slides upwards along said axis.

2. A film-chamber cover of claim 1 wherein said resilient member is a spring.

3. A film-chamber cover of claim 1 wherein said guiding mechanism comprises a same plural number of straight ribs and straight guiding grooves coordinated with said straight ribs, each of said straight ribs and coordinated guiding grooves being parallel to said axis and being engaged with each other in a slidably manner, wherein said guiding grooves are formed around said inner surface of said hole of said upper cover and said straight ribs are formed around said outer surface of said moving shaft.

4. A film-chamber cover of claim 1 wherein said guiding mechanism comprises a same plural number of straight ribs and straight guiding grooves coordinated with said straight ribs, each of said straight ribs and coordinated guiding grooves being parallel to said axis and being engaged with each other in a slidably manner, wherein said straight ribs are formed around said inner surface of said hole of said upper cover and said guiding grooves are formed around said outer surface of said moving shaft.

5. A film-chamber cover of claim 1 wherein said swing mechanism comprises an oblique ridge and a side ridge coordinated with said oblique ridge, said oblique ridge being furnished on said swing plate and extending upwards from said swing plate, said side ridge being formed on a lower end of said outer surface of said moving shaft and being located right above said oblique ridge such that when said moving shaft slides downwards along said axis, said side ridge pushes said oblique ridge to perform said swing movement of said swing plate.

6. A film-chamber cover of claim 1 wherein said swing mechanism comprises an oblique ridge and a protrusive ridge coordinated with said oblique ridge, said oblique ridge being furnished on a lower end of said moving shaft and extending downwards from said moving shaft, said protrusive ridge being formed on said swing plate and being located right below said oblique ridge such that when said moving shaft slides downwards along said axis, said oblique ridge pushes said protrusive ridge to perform said swing movement of said swing plate.

7. A film-chamber cover of claim 1 wherein said swing mechanism comprises a recessed guiding track and a sliding block slidably engaged with said guiding track at one end thereof, said guiding track being oblique and being formed on said swing plate, said sliding block being furnished on a lower end of said moving shaft and extending downwards from said moving shaft such that when said moving shaft slides downwards along said axis, said sliding block pushes said guiding track to perform said swing movement of said swing plate.

8. A film-chamber cover of claim 1 wherein said means for restoring said swing plate includes a spring.

9. A film-chamber cover of claim 1 further comprises a hinge member for pivotally connecting said film-chamber cover to a lower end of said film chamber of said APS camera such that said film-chamber cover is pivotal about said hinge member between a locking position covering the lower end of the film chamber and an opening position leaving the film chamber open for receiving said film cassette.

10. A film-chamber cover of claim 8 wherein said spring having its two ends hitched respectively to said bottom cover and one end of said swing plate for providing a force pushing said swing plate back to its original position.

11. A film-chamber cover of claim 9 wherein said hinge member is located at one end of said film-chamber cover.

* * * * *